(12) United States Patent
Ogata

(10) Patent No.: US 9,556,797 B2
(45) Date of Patent: Jan. 31, 2017

(54) FUEL SUPPLY DEVICE OF GAS TURBINE ENGINE

(75) Inventor: Hideki Ogata, Kakogawa (JP)

(73) Assignee: KAWASAKI JUKOGYO KABUSHIKI KAISHA, Kobe-shi, Hyogo (JP)

(*) Notice: Subject to any disclaimer, the term of this patent is extended or adjusted under 35 U.S.C. 154(b) by 901 days.

(21) Appl. No.: 13/642,803

(22) PCT Filed: Apr. 21, 2011

(86) PCT No.: PCT/JP2011/002333
§ 371 (c)(1),
(2), (4) Date: Dec. 4, 2012

(87) PCT Pub. No.: WO2011/132426
PCT Pub. Date: Oct. 27, 2011

(65) Prior Publication Data
US 2013/0067919 A1   Mar. 21, 2013

(30) Foreign Application Priority Data

Apr. 23, 2010   (JP) ................. 2010-100126

(51) Int. Cl.
*F02C 7/228*  (2006.01)
*F02C 7/232*  (2006.01)
(Continued)

(52) U.S. Cl.
CPC ............. *F02C 7/228* (2013.01); *F02C 7/232* (2013.01); *F02C 9/263* (2013.01); *F23K 5/005* (2013.01);
(Continued)

(58) Field of Classification Search
CPC ........... F02C 7/228; F02C 7/232; F02C 9/263; F23D 2900/00015; F23K 2401/201; F23K 5/005; F23R 3/286; F23R 3/343; F16K 11/14; F16K 11/16; F16K 11/161
See application file for complete search history.

(56) References Cited

U.S. PATENT DOCUMENTS 4,027,473 A * 6/1977 Baker ..................... 60/39.281
5,066,221 A   11/1991 Becker
(Continued)

FOREIGN PATENT DOCUMENTS

JP   52-113414 A   9/1977
JP   05-052124 A   3/1993
(Continued)

*Primary Examiner* — Devon Kramer
*Assistant Examiner* — Kenneth J Hansen
(74) *Attorney, Agent, or Firm* — Sughrue Mion, PLLC

(57) ABSTRACT

A fuel divider included in a fuel supply device of a gas turbine engine includes a movable member which is movable according to a fuel pressure at a fuel entrance, opens only a pilot port when the fuel pressure at the fuel entrance is lower than a first pressure, and opens both of the pilot port and the main port when the fuel pressure at the fuel entrance is higher than the first pressure. In addition, the fuel divider includes an adjusting means which adjusts a value of the first pressure in such a manner that it applies to the movable member a counter force in a direction opposite to a direction in which the movable member moves according to the fuel pressure at the fuel entrance, and adjusts the counter force.

12 Claims, 13 Drawing Sheets

(51) Int. Cl.
*F23K 5/00* (2006.01)
*F23R 3/28* (2006.01)
*F23R 3/34* (2006.01)
*F02C 9/26* (2006.01)

(52) U.S. Cl.
CPC .............. *F23R 3/286* (2013.01); *F23R 3/343* (2013.01); *Y02T 50/672* (2013.01)

(56) References Cited

U.S. PATENT DOCUMENTS

| | | |
|---|---|---|
| 5,735,117 A | 4/1998 | Toelle |
| 7,162,875 B2 * | 1/2007 | Fletcher et al. ................ 60/773 |
| 2008/0245074 A1 * | 10/2008 | Oda et al. ....................... 60/737 |

FOREIGN PATENT DOCUMENTS

| | | |
|---|---|---|
| JP | 05-501758 A | 4/1993 |
| JP | 06-129262 A | 5/1994 |
| JP | 06-213456 A | 8/1994 |
| JP | 09-119323 A | 5/1997 |
| JP | 2564801 Y2 | 3/1998 |
| JP | 2004-027891 A | 1/2004 |
| JP | 2008-255897 A | 10/2008 |
| JP | 4220558 B2 | 2/2009 |

* cited by examiner

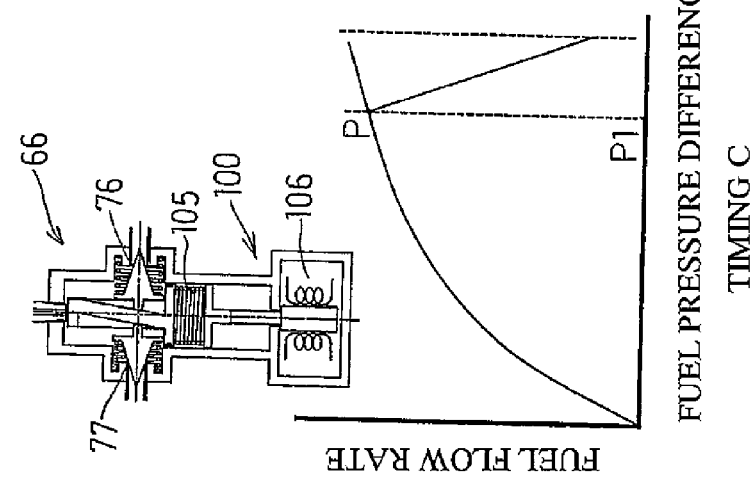
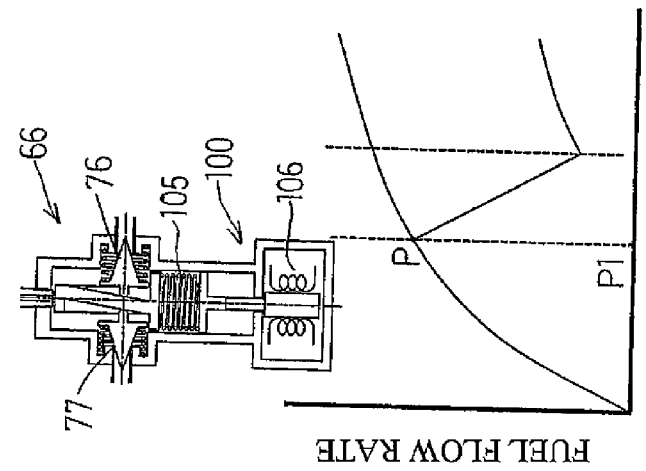
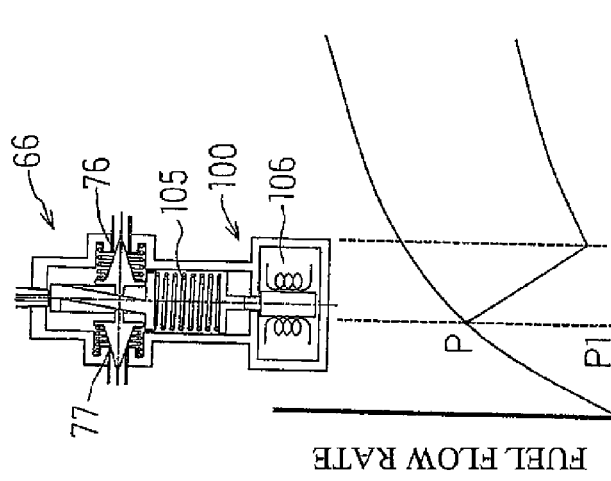

FUEL SUPPLY DEVICE OF GAS TURBINE ENGINE

CROSS REFERENCE TO RELATED APPLICATIONS

This application is a National stage of International Application No. PCT/JP2011/002333, filed on Apr. 21, 2011, and claims priority based on Japanese Patent Application No. 2010-100126, Apr. 23, 2010, the contents of all of which are incorporated herein by reference in their entirety.

TECHNICAL FIELD

The present invention relates to a fuel supply device of a gas turbine engine for supplying a fuel to a combustor including pilot burners and main burners.

BACKGROUND ART

For environment protection purposes, in gas turbine engines, strict environmental standards are set in a composition of combustion exhaust gas emitted. It is required to reduce harmful substances such as nitrogen oxide (hereinafter expressed as $NO_x$) from the exhaust gas. In large-sized gas turbines and engines for aircraft, a pressure ratio tends to be set high, because of requirement of low fuel consumption and a high power output. Correspondingly, air at an entrance of a fuel supply device tends to be placed in higher temperature and higher pressure conditions. With an increase in the temperature of the air at the entrance of the fuel supply device, a combustion temperature rises, which may undesirably result in an increase in the amount of $NO_x$ in the exhaust gas.

Under the circumstances, in recent years, there has been proposed a combined combustion method in which two combustion methods, i.e., a lean pre-mixed combustion method which can reduce the amount of $NO_x$ generation effectively, and a diffusion combustion method which has high ignition performance and high flame stabilizing performance are combined. In the lean pre-mixed combustion method, air and fuel are pre-mixed and an air-fuel mixture with a uniform fuel concentration is combusted. In this method, a combustion zone in which a flame temperature is locally high does not exist. In addition, the flame temperature can be lowered as a whole because of lean fuel. Therefore, the lean pre-mixed combustion method has an advantage that the amount of $NO_x$ generation can be reduced effectively. However, in the lean pre-mixed combustion method, since a great amount of air and fuel are mixed uniformly, a fuel concentration in a combustion zone is very low, which degrades combustion stability particularly under a low load state. By comparison, in the diffusion combustion method, the fuel and the air are combusted while diffusing and mixing them. This method has advantages that a flame is less likely to vanish even during the low load state, and the flame stabilizing performance is high. Therefore, in the combined combustion method which is a combination of the lean pre-mixed combustion method and the diffusion combustion method, combustion stability in a diffusion combustion zone can be maintained during starting or during the low load state, and the amount of $NO_x$ generation in a lean pre-mixed combustion zone can be reduced during a high load state.

A fuel supply device according to the combined combustion method includes pilot burners which spray a fuel so as to form a diffusion combustion zone within a combustion chamber by the diffusion combustion method, and main burners which supply an air-fuel mixture containing pre-mixed fuel and air so as to form a pre-mixed combustion zone within the combustion chamber by the lean pre-mixed combustion method. In this fuel supply device, fuel is supplied only to the pilot burners during starting or during the low load state, while the fuel is also supplied to the main burners in addition to the pilot burners during the high load state. When the gas turbine engine transitions from the low load state to the high load state, the fuel supply device controls a fuel flow rate so that a fuel dividing ratio between a fuel supplied to the pilot burners and a fuel supplied to the main burners changes gradually from 1:0 to, for example, 1:9, while maintaining a proper value of the ratio for achievement of stable combustion and reduction of $NO_x$.

In a conventional fuel supply device by the combined combustion method, to perform the above complicated control, flow control valves are respectively provided in a pilot fuel passage through which the fuel is supplied to the pilot burners and a main fuel passage through which the fuel is supplied to the main burners, and a controller controls these flow control valves (Patent Literature 1).

However, if the flow control valves are provided in these two fuel passages, respectively, as described above, a ratio of the weight and cost of the flow control valves and the controller with respect to weight and cost of an overall engine increases especially in a small-sized gas turbine for aircraft, and its influence is non-negligible, although the ratio is differed between a gas turbine for aircraft and a gas turbine for industry, or between a large-sized gas turbine and a small-sized gas turbine. This precludes application of the combined combustion method which requires an additional fuel control system (flow control valves and controller) to the small-sized gas turbine for aircraft. Further, the addition of the fuel control system causes an increased weight and a complicated structure.

Under the circumstances, the applicant proposed a system in which a fuel divider is provided between a fuel passage through which the fuel is supplied to the pilot burners and a fuel passage through which the fuel is supplied to the main burners, and a collecting fuel passage through which the fuel is supplied to these fuel passages, and a controller controls the fuel divider (Patent Literature 2).

CITATION LISTS

Patent Literature

Patent Literature 1: Japanese Laid-Open Patent Application Publication No. Hei. 5-52124
Patent Literature 2: Japanese Patent No. 4220558

SUMMARY OF THE INVENTION

Technical Problem

The system using the above stated fuel divider is configured to switch a dividing ratio between the fuel supplied to the pilot fuel passage and the fuel supplied to the main fuel passage at a certain switching point. It is sometimes necessary to change the switching point at which the dividing ratio is switched, according to an operating pattern associated with a load of an engine. However, it is difficult to change the switching point quickly and at a proper timing.

An object of the present invention is to provide a fuel supply device of a gas turbine engine which is capable of easily changing a switching point at which a dividing ratio between a fuel supplied to a pilot fuel passage and a fuel supplied to a main fuel passage is switched, according to an operating pattern of an engine, in a case where the dividing ratio is switched at a certain switching point.

Solution to Problem

To achieve the above object, there is provided a fuel supply device of a gas turbine engine, which supplies a fuel to a combustor including a pilot burner and a main burner; the fuel supply device comprising: a pilot fuel passage through which the fuel is supplied to the pilot burner; a main fuel passage through which the fuel is supplied to the main burner; a collecting fuel passage through which the fuel is supplied to the pilot fuel passage and to the main fuel passage; and a fuel divider which divides the fuel supplied from the collecting fuel passage to feed the fuel to the pilot fuel passage and to the main fuel passage; wherein the fuel divider includes: a fuel entrance into which the fuel supplied from the collecting fuel passage is introduced; a pilot port connected to the pilot fuel passage; a main port connected to the main fuel passage; a movable member which is movable according to a fuel pressure at the fuel entrance, the movable member being configured to open only the pilot port when the fuel pressure at the fuel entrance is lower than a first pressure, and to open both of the pilot port and the main port when the fuel pressure at the fuel entrance is higher than the first pressure; and an adjusting means for adjusting a value of the first pressure in such a manner that the adjusting means applies to the movable member a counter force in a direction opposite to a direction in which the movable member moves according to the fuel pressure at the fuel entrance, and adjusts the counter force.

In accordance with this configuration, since the adjusting means adjusts the counter force applied to the movable member, the value of the first pressure which is a point at which the main port is opened can be adjusted.

Advantageous Effects of the Invention

A fuel supply device of a gas turbine engine of the present invention can easily change a switch point of a fuel dividing ratio, according to an operating pattern of an engine.

BRIEF DESCRIPTION OF THE DRAWINGS

FIG. 6 is a cross-sectional view of the fuel divider, wherein

FIGS. 8A to 8C are curved lines showing a change in a switching timing of fuel dividing which is adjusted by an adjusting means.

DESCRIPTION OF THE EMBODIMENT

Hereinafter, preferred embodiments of the present invention will be described with reference to the drawings.

Embodiment 1

First of all, Embodiment 1 of the present invention will be described with reference to FIGS. 1 to 8. Hereinafter, the configuration of a combustor, the configuration of a fuel control system, the configuration of a fuel divider, the operation of the fuel divider, and adjustment of a switching timing, will be described in this order.

<Configuration of Combustor>

Figure 1:
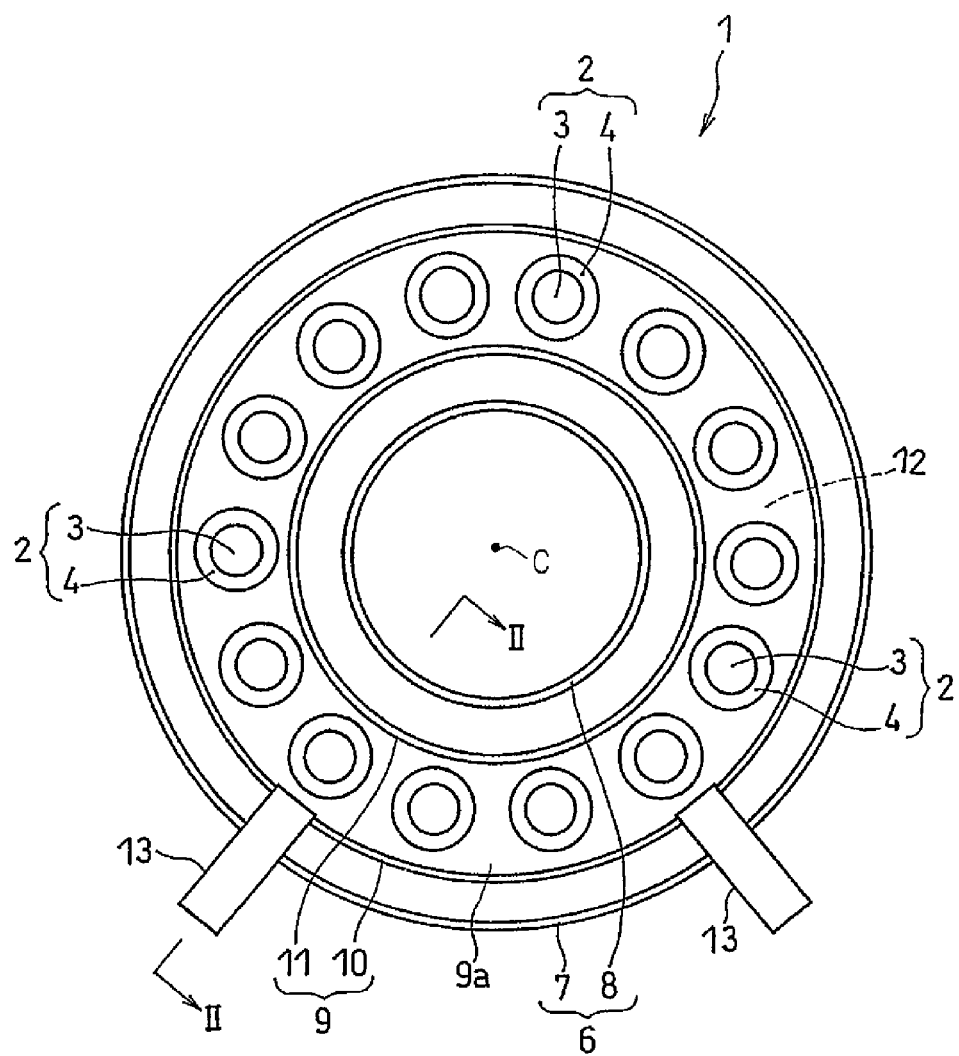
FIG. 1 is a schematic front view showing a fuel supply device of a gas turbine engine according to Embodiment 1 of the present invention.

FIG. 1 shows a head portion of a combustor 1 of a gas turbine engine including a fuel supply device according to Embodiment 1 of the present invention. The combustor 1 is an apparatus configured to mix a fuel with compressed air supplied from a compressor and combust the resulting air-fuel mixture. High-temperature and high-pressure combustion gas generated in the combustor 1 is supplied to a turbine to drive the turbine.

The combustor 1 of the present embodiment is an annular type. As shown in FIG. 1, the combustor 1 has a configuration in which an annular inner casing 8 is disposed inward relative to an annular outer casing 7. The outer casing 7 and the inner casing 8 constitute a combustor housing 6 having an annular inner space (see FIG. 2). In the annular inner space of the combustor housing 6, a combustion tube 9 is provided. The combustion tube 9 includes a tubular outer liner 10 and a tubular inner liner 11 which are disposed concentrically. The combustor tube 9 has an annular combustion chamber 12 inside thereof. A plurality of (14 in the present embodiment) fuel injection units 2 for injecting fuel to the interior of the combustion chamber 12 are attached to a top wall 9a of the combustion tube 9. The fuel injection units 2 are annularly arranged at equal intervals. Each of the fuel injection units 2 includes a pilot burner 3 using a diffusion combustion method and a main burner 4 using a pre-mixed combustion method. A detail of these burners will be described later.

The combustor 1 is provided with two ignition plugs 13 penetrating the outer casing 7 and the outer liner 10. The two ignition plugs 13 extend in a radial direction of the combustion tube 9, and the tip end of each of the ignition plugs 13 is disposed to face one of the fuel injection units 2. The ignition plugs 13 are configured to ignite a combustible air-fuel mixture injected from the fuel injection units 2 facing the ignition plugs 13. A flame generated by ignition in the ignition plugs 13 is transferred to a combustible air-fuel mixture injected from an adjacent fuel injection unit 2, and further to a combustible air-fuel mixture injected from an adjacent fuel injection unit 2. Finally, the flame spreads to the entire periphery.

Figure 2:
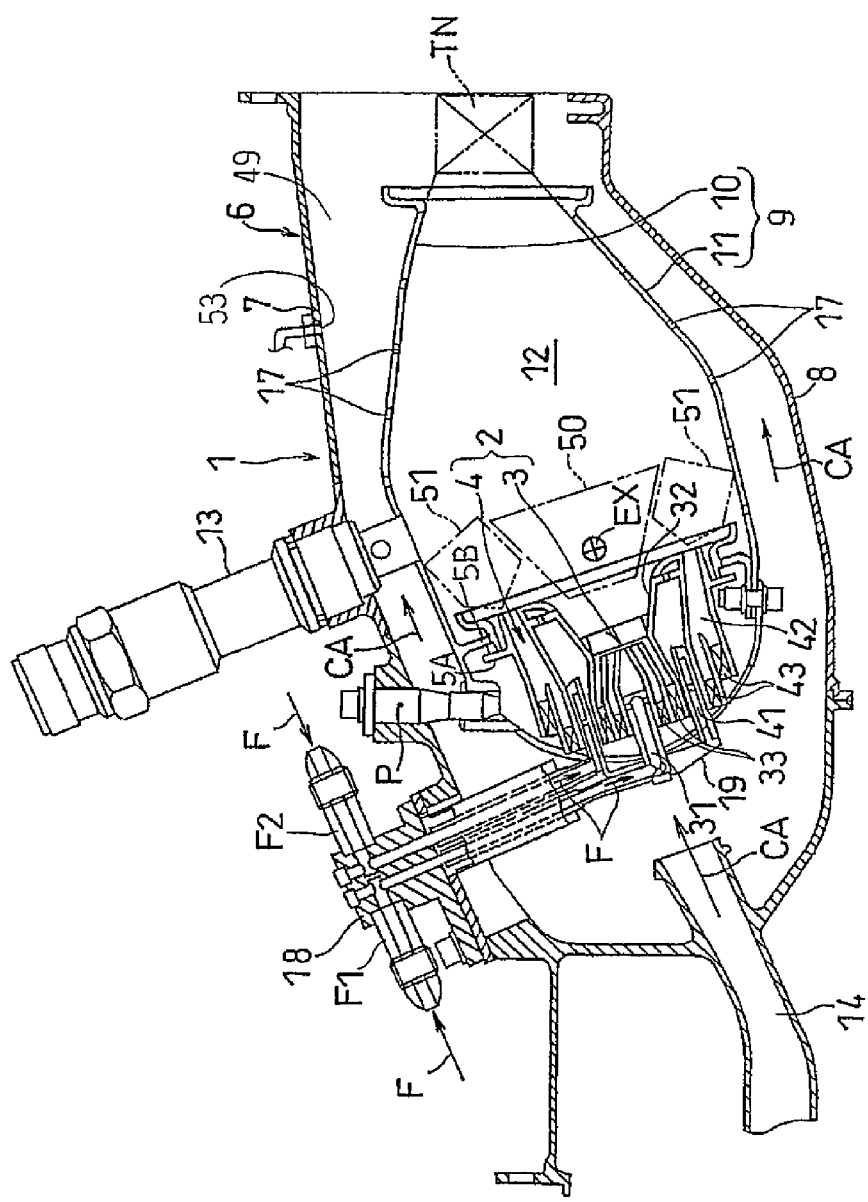
FIG. 2 is an enlarged longitudinal sectional view taken along line II-II of FIG. 1.

FIG. 2 is an enlarged cross-sectional view taken along line II-II of FIG. 1. Compressed air CA supplied from the compressor is introduced into the inner space of the combustor housing 6 via an annular pre-diffuser passage 14. The introduced compressed air CA is supplied to the fuel injection units 2, and to the interior of the combustion chamber 12 through a plurality of air introduction ports 17 provided on each of the outer liner 10 and the inner liner 11. Fuel pipe units 18 are coupled to a base portion 19 of the combustion tube 9 and supported on the outer casing 7. The fuel pipe units 18 constitute first fuel supply systems F1 for supplying a fuel for diffusion combustion to the pilot burners 3 and second fuel supply systems F2 for supplying a fuel for lean pre-mixed combustion to the main burners 4.

Each of the fuel injection units 2 is mounted to the outer liner 10 via a flange 5A provided at its outer peripheral portion and a support 5B provided at the outer liner 10. The outer liner 10 is mounted to the outer casing 7 by a liner fastening pin P. A first-stage nozzle TN of the turbine is coupled to the downstream end portion of the combustion tube 9. At a downstream side edge of the outer casing 7, a pressure take-out port 53 is provided to take out the pressure of the compressed air CA. The pressure take-out port 53 allows the pressure in an air passage 49 formed between the outer casing 7 and the outer liner 10 to be taken out. The pressure taken out through the pressure take-out port 53 is equal to an outlet pressure of the compressor and an entrance pressure of the combustor 1.

Each of the pilot burners 3 is provided at the center portion of the corresponding fuel injection unit 2. The pilot burner 3 includes a fuel nozzle 31, a diffusion passage 32, and inside and outside double swirlers 33. Fuel F for diffusion combustion from the first fuel supply system F1 is injected from the fuel nozzle 31. The fuel F injected from the fuel nozzle 31 is atomized by the compressed air CA which has passed through the swirlers 33, and then is sprayed into the combustion chamber 12 through the diffusion passage 32, thereby forming a diffusion combustion zone 50.

The main burner 4 of an annular shape is provided to enclose the outer periphery of the pilot burner 3. The main burner 4 includes fuel nozzles 41 arranged at circumferentially equal intervals, a pre-mixed passage 42, and inside and outside double swirlers 43. Fuel F for pre-mixed combustion which is supplied from the second fuel supply system F2 is injected from the fuel nozzles 41 into the pre-mixed passage 42. The fuel F for pre-mixed combustion injected into the pre-mixed passage 42 is mixed with the compressed air CA which has passed through the swirlers 43, and results in a pre-mixed air-fuel mixture. The pre-mixed air-fuel mixture is injected into the combustion chamber 12, thereby forming a pre-mixed combustion zone 51.

The pilot burner 3 is supplied with the fuel F from the first fuel supply system F1 in all load zones. By comparison, the main burner 4 is supplied with the fuel F from the second fuel supply system F2 in a high load zone (high fuel pressure zone) and a medium load zone (medium fuel pressure zone). The high load zone is a load zone which is not less than, for example, 70% of a full load. The medium load zone is present between the high load zone and a low load zone (low fuel pressure zone), and is a load zone which is, for example, 40~70% of the full load. The main burner 4 is not supplied with the fuel F in the low load zone which is not more than, for example, 40% of the full load. Therefore, in the low load zone, only the compressed air CA is supplied from the main burner 4 to the combustion chamber 12 via the swirlers 43.

<Configuration of Fuel Control System>

Figure 3:
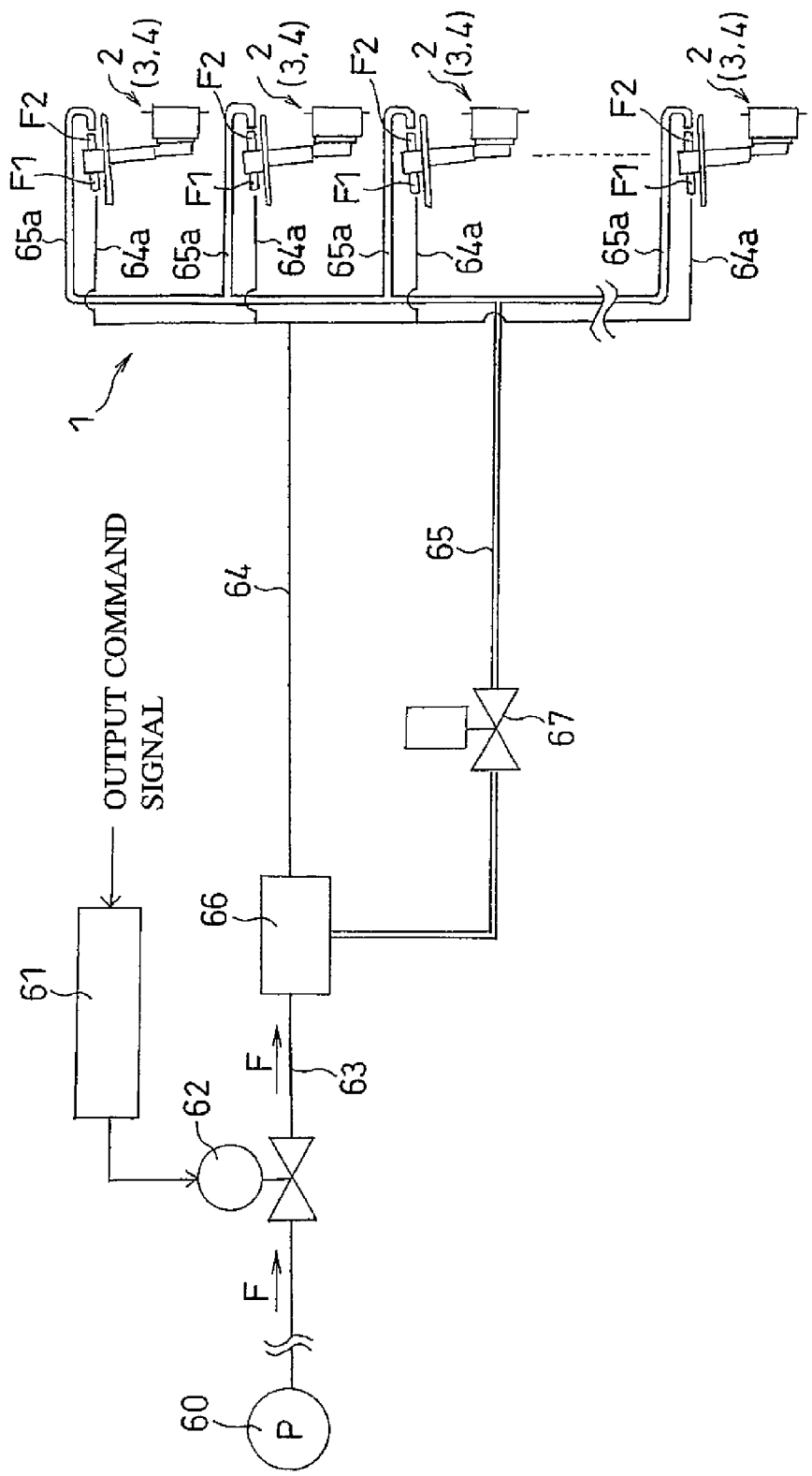
FIG. 3 is a view showing a fuel control system.

Next, a fuel control system of the gas turbine engine will be described with reference to FIG. 3. As shown in FIG. 3, a common pilot fuel passage 64 and a common main fuel passage 65 are connected to the fuel injection units 2 of the combustor 1. The upstream end of the pilot fuel passage 64 and the upstream end of the main fuel passage 65 are connected to a collecting fuel passage 63. A fuel divider 66 is provided at a branch portion at which the pilot fuel passage 64 and the main fuel passage 65 branch from the collecting fuel passage 63. The collecting fuel passage 63 is provided with a fuel pump 60 for feeding the fuel F to the interior of the collecting fuel passage 63 and a total flow control valve 62. The total flow control valve 62 is controlled by a fuel controller 61. The fuel controller 61 receives an output command signal, for example, by operating a throttle lever provided outside. In accordance with the command signal, the fuel controller 61 sets an opening degree of the total flow control valve 62. By setting the opening degree of the total flow control valve 62 properly, the fuel is supplied to the entire combustor 1 with a required amount, via the collecting fuel passage 63, the pilot fuel passage 64, and the main fuel passage 65.

The pilot fuel passage 64 branches into plural passages (14 passages). Branch passages 64a communicate with the pilot burners 3 via the first fuel supply systems F1 of the corresponding fuel injection units 2, respectively. Likewise, the main fuel passage 65 branches into plural passages (14 passages). Branch passages 65a communicate with the main burners 4 via the second fuel supply systems F2 of the corresponding fuel injection units 2, respectively. The main fuel passage 65 is provided with a cut-off valve 67. The cut-off valve 67 closes the main fuel passage 65 under an engine load state which is not more than a certain load, i.e., in the low load zone including starting of the gas turbine engine. In this configuration, in the low load zone, the main fuel passage 65 is closed more surely, and the fuel is supplied only to the pilot burners 3 which perform the diffusion combustion. As a result, stability of combustion including ignition performance and flame stabilizing performance can be ensured. As described later, in a case where a sufficient seal function in the fuel divider 66 is ensured, the main fuel passage 65 can be closed surely. In this case, the cut-off valve 65 may be omitted.

<Configuration of Fuel Divider>

Figure 4:
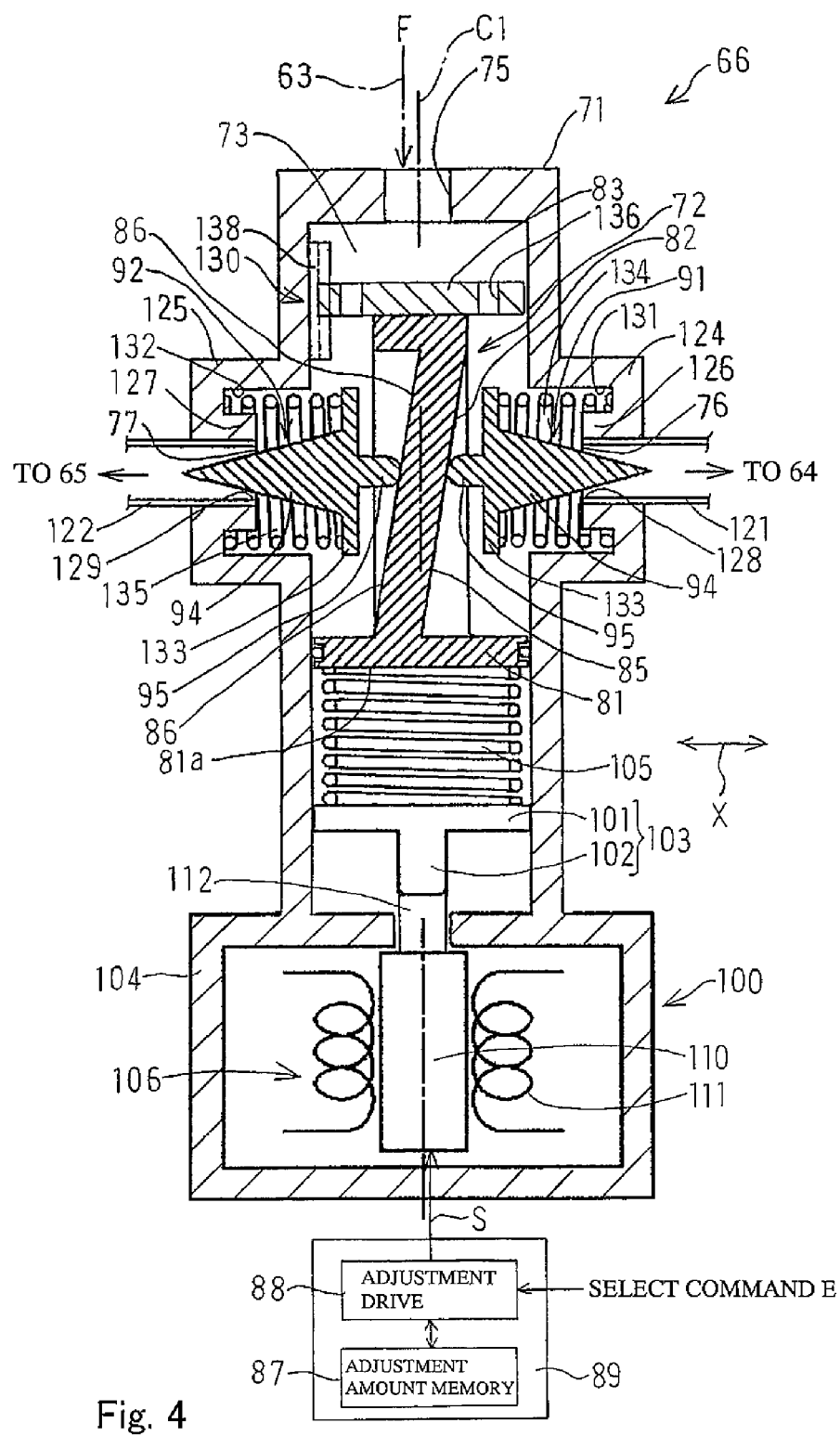
FIG. 4 is a longitudinal sectional view showing a fuel divider.
Figure 5:
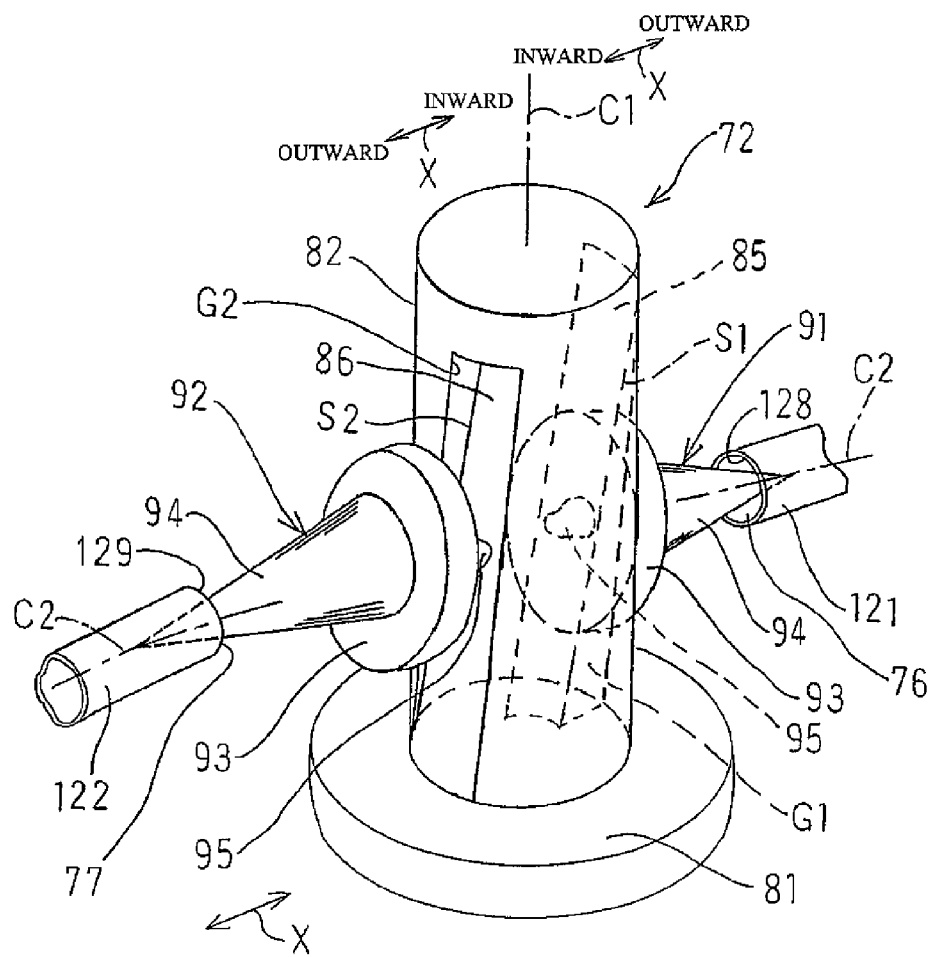
FIG. 5 is a perspective view showing main components of the fuel divider of FIG. 4.

Next, the configuration of the fuel divider 66 will be described with reference to FIGS. 4 and 5. FIG. 4 is a longitudinal sectional view showing the fuel divider 66. As shown in FIG. 4, the fuel divider 66 of the present embodiment is a needle-valve type, and includes a housing unit 71, a movable member 72, a pilot port needle valve element 91, a main port needle valve element 92, and an adjustment means 100. Hereinafter, these components will be described sequentially.

The housing unit 71 is a member for housing the movable member 72 therein. As shown in FIG. 4, the housing unit 71 is provided on a top portion thereof with a fuel entrance (inlet) 75 communicating with the downstream portion of the collecting fuel passage 63. Protruding wall portions 124 and 125 are provided on the peripheral wall of the housing unit 71 to face each other, with respect to a center axis C1 between the protruding wall portions 124 and 125. The protruding wall portions 124 and 125 protrude outward in the radial direction X. Bosses 126 and 127 are provided at the protruding portions 124 and 125, respectively, to protrude inward in the radial direction X. Seal pipes 121 and 122 are secured to the inside of the protruding wall portion 124 and to the inside of the protruding wall portion 125, respectively. Valve seats 128 and 129 on which the needle valve elements 91 and 92 are to be seated are provided on inner end portions (entrance end portions) of the seal pipes 121 and 122, respectively. The seal pipes 121 and 122 are made of rubber or resin having higher elasticity than the metal-made needle valve elements 91 and 92. The downstream portion of the seal pipe 121 communicates with the pilot fuel passage 64, while the upstream end portion of the seal pipe 121 constitutes the pilot port 76. The downstream portion of the seal pipe 122 communicates with the main fuel passage 65, while the upstream end portion of the seal pipe 122 constitutes the main port 77.

A rotation inhibiting mechanism 130 is provided at the upper portion of the housing unit 71. The rotation inhibiting mechanism 130 includes a guide portion 83 and a guide member 138. The guide portion 83 is joined to the upper surface of a drive portion 82 by welding or is integrated with the drive portion 82. The guide portion 83 is provided with a plurality of through-holes 136 extending in the direction of the center axis C1. The guide member 138 is attached to the inner peripheral surface of the housing unit 71, and is configured to guide the guide portion 83 (i.e., movable member 72) such that the guide portion 83 is inhibited from rotating. As described later, the rotation inhibiting mechanism 130 allows a pilot cam surface 85 and a cam follower 95 of the pilot port needle valve element 91 to face each other precisely, and a main cam surface 86 and a cam follower 95 of the main port needle valve element 92 to face each other precisely.

The movable member 72 is a member housed in the housing unit 71, and being movable in the direction (axial direction) of the center axis C1. The movable member 72 is configured to move axially according to a fuel pressure at the fuel entrance 75. As shown in FIGS. 4 and 5, the movable member 72 includes a large-diameter disc-shaped pressure receiving bottom plate 81 provided at a base end portion (lower end portion) to receive the fuel pressure, the small-diameter cylindrical drive portion 82 extending axially upward and continuously with the pressure receiving bottom plate 81, and the large-diameter disc-shaped guide portion 83 secured to or integrated with the top portion of the drive portion 82. As shown in FIG. 5, the drive portion 82 has the pilot cam surface 85 on one side thereof, which is formed by a groove portion G1 extending axially. In addition, the drive portion 82 has the main cam surface 86 on the other side thereof which is opposite to the one side, which is formed by a groove portion G2 extending axially. The pilot cam surface 85 has an inclined surface S1 advancing gradually outward in the radial direction X from a base end toward a tip end (in an upward direction). The main cam surface 86 has an inclined surface S2 receding gradually inward in the radial direction X from a base end toward a tip end (in the upward direction).

The pilot port needle valve element 91 and the main port needle valve element 92 are members movable according to the movement of the movable member 72. The needle valve elements 91 and 92 are disposed to face each other with respect to the center axis C1. When the movable member 72 moves axially, the pilot port needle valve element 91 is driven by the pilot cam surface 85 and the main port needle valve element 92 is driven by the main cam surface 86. The needle valve elements 91 and 92 are unable to move in the direction of the center axis C1, and are able to move in the radial direction X.

Each of the needle valve elements 91 and 92 has a center axis C2 in the radial direction X. Each of the needle valve elements 91 and 92 includes a disc-shaped flange 93, a valve element portion 94 located outward relative to the flange 93 in the direction of the center axis C2, and the cam follower 95 located inward relative to the flange 93 in the direction of the center axis C2. Among the above components, the valve element portion 94 has a conical shape having an outer diameter decreasing in an outward direction of the direction of the center axis C2. The cam follower 95 extends in a direction opposite to the direction in which the valve element portion 94 extends and is movable on each of the cam surfaces 85 and 86. Furthermore, in the housing unit 71, there are provided an annular recess 131 between the protruding wall portion 124 and the boss 126, and an annular recess 132 between the protruding wall portion 125 and the boss 127. Between the annular recess 131 and the flange (spring receiver seat) 133 of the needle valve element 91, an opening spring member 134 constituted by a coil spring is inserted, while between the annular recess 132 and the flange (spring receiver seat) 133 of the needle valve element 92, an opening spring member 135 constituted by a coil spring is inserted. The needle valve element 91 is applied with a force from the opening spring member 134 to be away from the valve seat 128, while the needle valve element 92 is applied with a force from the opening spring member 135 to be away from the valve seat 129.

The spring adjusting unit (adjusting means) 100 is configured to adjust a force (counter force) applied to the movable member 72. By adjusting the counter force applied to the movable member 72, the value of a first switch pressure as described later can be adjusted. As shown in FIG. 4, the spring adjusting unit 100 includes an adjustment spring element 105, a drive device 106, and a spring receiver element 103. The adjustment spring element 105 is a compressive spring formed in a coil shape to apply a spring force applied to the movable member 72 against the fuel pressure. The adjustment spring element 105 is positioned between a bottom surface 81a of the pressure receiving bottom plate 81 and the spring receiver element 103, and applies an upward force to the movable member 72. That is, the adjustment spring element 105 applies a counter force to the movable member 72 in a direction opposite to a direction in which the movable member 72 moves according to the fuel pressure at the fuel entrance 75. The drive device 106 is positioned below the adjustment spring element 105 and presses the adjustment spring element 105 in an axially upward direction. The drive device 106 is housed in a drive case 104 provided at the lower portion of the housing unit 71. The spring receiver element 103 is positioned between the adjustment spring element 105 and the drive device 106. The spring receiver element 103 includes a disc-shaped spring receiver seat 101 and a cylindrical protruding element 102 extending axially downward from the spring receiver seat 101.

As the drive device 106, for example, a stepping motor may be used. To be specific, the polarity of a stator 111 constituting the stepping motor 110 is changed sequentially. Since the polarity of the stator located at an outer side is changed, a rotor (not shown) rotates. A ball screw (not shown) is attached to the rotor. An actuator 112 is mounted to the tip end of the ball screw. The actuator 112 is coupled to the protruding element 102 of the spring receiver element 103. When the drive device 106 presses the actuator 112 in the axially upward direction, an initial strain amount of the adjustment spring element 105 changes, which adjusts an initial value of the counter force applied to the movable member 72. The stepping motor 110 is driven by a motor driver (not shown). Instead of the stepping motor, as the drive device 106, a hydraulic cylinder or a servo motor may be used.

The adjusting means 100 for adjusting the force (counter force) pre-applied to the movable member 72 using the drive device 106 is controlled by a switch timing adjusting device 89 as will be described later. The switch timing adjusting device 89 may be built into, for example, FADEC (full authority digital engine control) (not shown) which is a digital control device of an engine for an aircraft. Or, the switch timing adjusting device 89 may be provided separately from the FADEC and may be coupled to the FADEC.

<Operation of Fuel Divider>

Figure 6A:
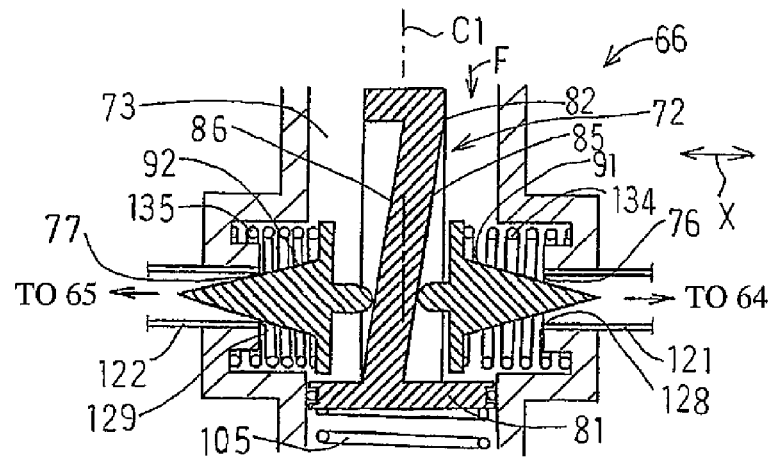
FIG. 6A shows a state in a low load zone.
Figure 6B:
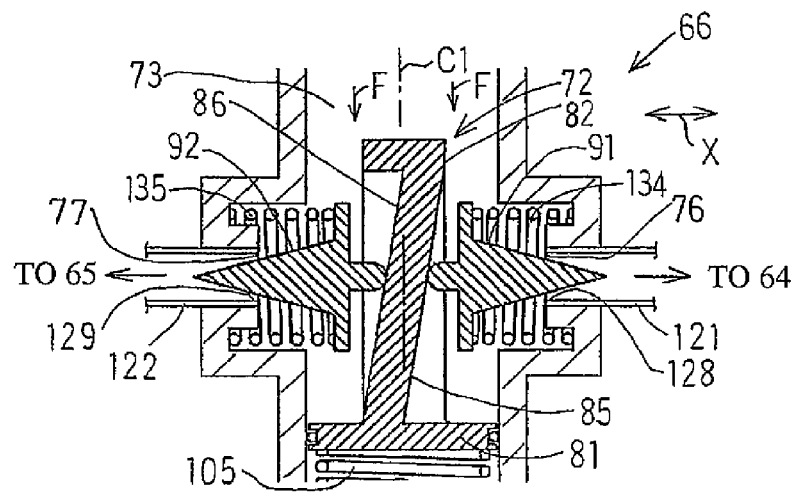
FIG. 6B shows a state in a medium load zone.
Figure 6C:
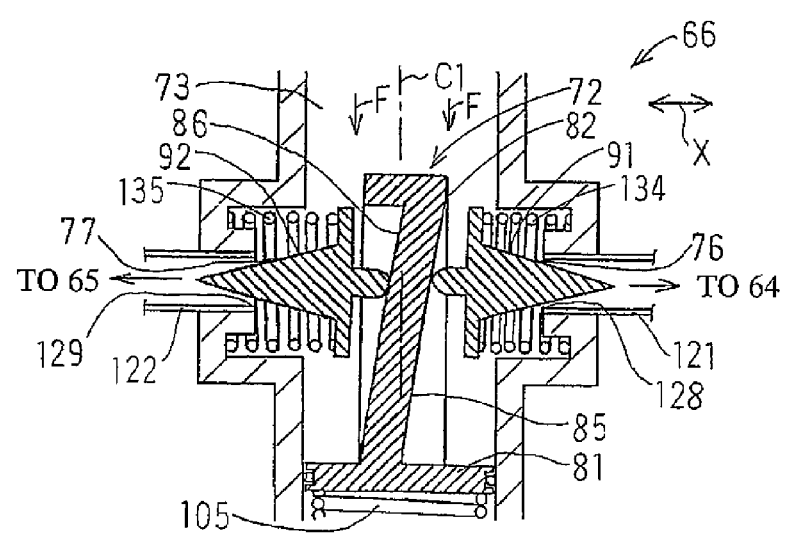
FIG. 6C shows a state in a high load zone.
Figure 7:
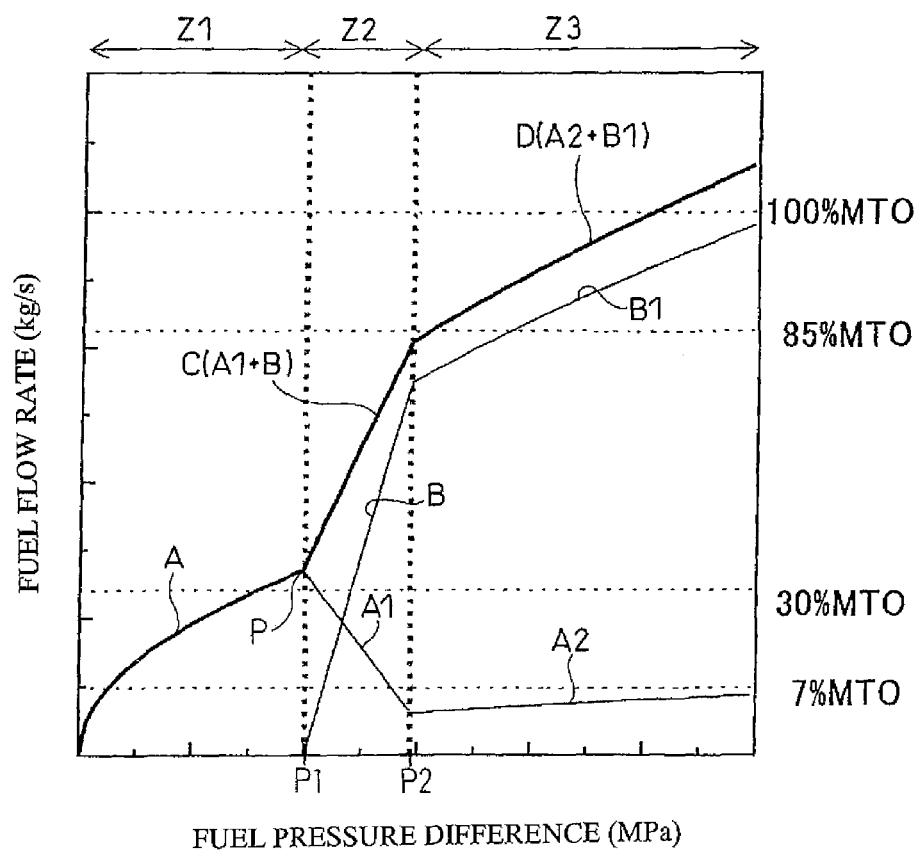
FIG. 7 is a graph showing the relationship between a fuel pressure and a fuel flow rate in the fuel divider.

Next, the operation of the fuel divider 66 of the present embodiment will be described with reference to FIGS. 6 and 7. FIGS. 6A to 6C are longitudinal sectional views of the fuel divider 66, wherein FIG. 6A shows a state in a low fuel pressure zone (low load zone), FIG. 6B shows a state in a medium fuel pressure zone (medium load zone), and FIG. 6C shows a state in a high fuel pressure zone (high load zone). FIG. 7 is a graph showing the relationship between a fuel pressure difference and a fuel flow rate. As defined herein, the term "fuel pressure difference" refers to a pressure difference between the pressure at the fuel entrance 75 of the fuel divider 66 and the pressure (equal to the pressure at an exit EX of the pilot burner 3) in the interior of the combustion chamber 12. The fuel pressure difference corresponds to an engine load. In FIG. 6, a curve line indicated by a bold line indicates a flow rate (hereinafter referred to as "total flow rate") which is a sum of the flow rate of the fuel flowing through the pilot fuel passage 64 and the flow rate of the fuel flowing through the main fuel passage 65.

In the low fuel pressure zone (low load zone) Z1 of FIG. 7, the fuel divider 66 is in the state shown in FIG. 6A. Specifically, in the low fuel pressure zone Z1, since the pressure of the fuel which enters through the fuel entrance 75 is lower, and the force for pressing down the pressure receiving bottom plate 81 (i.e., movable member 72) is smaller, the movable member 72 is pressed upward by the spring force applied by the adjustment spring element 105. Because of this, the main port needle valve element 92 contacts the lower portion of the main cam surface 86 and is located outward in the radial direction X. In this state, the main port needle valve element 92 is pressed against the valve seat 129, and the main port 77 is closed. In this way, since the main port 77 is closed by the pressing force applied by the main port needle valve element 92, a high seal performance is attained in the main port 77 during the closed state. On the other hand, the pilot port needle valve element 91 is applied with the spring force applied by the opening spring member 134 and pushed inward in the radial direction X. Thereby, the pilot port 76 is opened. Therefore, the fuel F which has entered from the fuel entrance 75, is supplied to the pilot fuel passage 64 through the through-holes 136 of the guide portion 83 and the pilot port 76.

As described above, in the low fuel pressure zone Z1, only the pilot port 76 is opened. Because of this, as shown in FIG. 7, the total flow rate becomes the flow rate of the fuel flowing through the pilot fuel passage 64. Since the fuel is injected only from the pilot burner 3 using the diffusion combustion method, stable combustion which has high ignition performance and high flame stabilizing performance can be ensured. In the low fuel pressure zone Z1, the flow rate of the fuel flowing through the pilot fuel passage 64 increases as the fuel pressure difference (load of gas turbine engine) increases. The low fuel pressure zone (low load zone) Z1 contains defined 30% MTO (Max Take Off).

Then, when the fuel pressure difference rises and reaches the first switch pressure P1 shown in FIG. 7, the fuel divider 66 is in the state shown in FIG. 6B. Specifically, in the medium fuel pressure zone (medium load zone) Z2, the movable member 72 moves downward and the main port needle valve element 92 contacts the center portion of the main cam surface 86. Thereby, the main port needle valve element 92 recedes inward in the radial direction X, and the main port 77 is opened. Therefore, the fuel F which has entered from the fuel entrance 75, is supplied to the main fuel passage 65 through the through-holes 136 of the guide portion 83 and the main port 77.

In the medium fuel pressure zone Z2, when the fuel pressure difference rises, the pilot port needle valve element 91 is pressed outward in the radial direction X by the pilot cam surface 85, which gradually decreases the opening degree of the pilot port 76. Therefore, the flow rate of the fuel in the pilot fuel passage 64 decreases with an increase in the fuel pressure difference as indicated by a curve A1 of FIG. 7. On the other hand, the flow rate of the fuel in the main fuel passage 65 gradually increases with an increase the fuel pressure difference as indicated by a curve B of FIG. 7. That is, a most part of the fuel F is supplied to the main fuel passage 65, and the remaining part of the fuel F is supplied to the pilot fuel passage 64. As indicated by a curve C (curve A1+curve B), the total flow rate increases. The fuel is supplied to the pilot fuel passage 64 of FIG. 4 by gradually closing the pilot port 76. Therefore, the flow rate of the fuel in the pilot fuel passage 64 can be decreased smoothly.

Then, when the fuel pressure difference further rises and reaches a second switch pressure P2 shown in FIG. 7, the fuel divider 66 is in the state shown in FIG. 6C. That is, in the high fuel pressure zone (high load zone) Z3, the movable member 72 further moves downward, the opening degree of the main port 77 further increases, and the opening degree of the pilot port 76 further decreases. In the high fuel pressure zone Z3 of FIG. 7, the motion of the movable member 72 is restricted by a stopper or the like although not shown, and therefore, the opening degree of the main port 77 and the opening degree of the pilot port 76 remain unchanged even when the fuel pressure difference increases. Because of this, as shown in FIG. 7, in the high fuel pressure zone Z3, the flow rate in the pilot fuel passage 64 increases with the fuel pressure difference as indicated by a curve A2, and the flow rate in the main fuel passage 65 increases with the fuel pressure difference as indicated by a curve B1. Therefore, the total flow rate in the high fuel pressure zone Z3 increases as indicated by a curve D (curve A2+curve B1).

In the high fuel pressure zone Z3, the ratio between the flow rate of the fuel supplied to the pilot fuel passage 64 and the flow rate of the fuel supplied to the main fuel passage 65 is set to a predetermined ratio 1:9. The high fuel pressure zone (high load zone) Z3 contains defined 85% MTO. In the high fuel pressure zone Z3, pre-mixed air-fuel mixture combustion is primarily performed by using the main burners 4 (see FIG. 2), thereby reducing $NO_x$, while diffusion combustion is secondarily performed by using the pilot burners 3, thereby ensuring stable combustion.

<Adjustment of Switch Timing>

Next, adjustment of the switching timing will be described with reference to FIG. 8. For example, in the case of the gas turbine engine for the aircraft, the timing when the ratio between the fuel supplied to the pilot fuel passage 64 and the fuel supplied to the main fuel passage 65 is switched is sometimes changed according to a flight pattern of the aircraft (operating pattern of the engine). In exemplary flight patterns of the aircraft, there are a case where the aircraft takes off and then rises gently and a case where the aircraft takes off and then rises at a high velocity.

FIG. 8 is views showing a difference in a switch timing of the fuel ratio due to a difference in an initial load applied to the movable member 72. In the example of FIG. 8A, the initial length of the adjustment spring element 105 is longest and the initial load applied to the movable member 72 is smallest. In this case, the main port 77 is opened at an earliest timing. In the example of FIG. 8B, the initial length of the adjustment spring element 105 is shorter than that in the example of FIG. 8A, and an initial load applied to the movable member 72 is greater than that in the example of FIG. 8A. In the example of FIG. 8C, the initial length of the adjustment spring element 105 is shortest and the initial load applied to the movable member 72 is greatest. In this case, the main port 77 is opened at a latest timing.

That is, in the order of FIGS. 8A, 8B and 8C, the spring force (counter force) applied by the adjustment spring element 105 to the movable member 72 increases, and the value of the first switch pressure P1 which is a boundary between the low fuel pressure zone Z1 and the medium fuel pressure zone Z2 shifts and becomes greater. By setting the value of the first switch pressure P1 appropriately, the fuel can be supplied to the pilot fuel passage 64 and to the main fuel passage 65 in an appropriate schedule corresponding to each of a flight pattern in which the aircraft takes off and then rises, a flight pattern in which the aircraft approaches and lands on the ground, a flight pattern in which the aircraft cruises and then is accelerated or decelerated, etc.

The point of the above stated switch timing (value of the first switch pressure) is set by a switch timing adjustment device 89 (see FIG. 4). The switch timing adjustment device 89 includes an adjustment amount memory means 87 and an adjustment drive means 88. The adjustment amount memory means 87 contains excitation forces of the stator 111, i.e., the adjustment amounts of the actuator 112, which correspond to timings A, B, and C shown in FIGS. 8A, 8B, and 8C, respectively. The adjustment drive means 88 receives a selection command E (e.g., any one of the timings A, B, and C) corresponding to a certain flight pattern, and obtains an adjustment amount corresponding to that timing, from the adjustment amount memory means 87. Then, the adjustment drive means 88 outputs an adjustment electric signal corresponding to the obtained adjustment amount to the drive device 106 to adjust the excitation force of the stator 111. In this way, the switching of the fuel ratio is performed at the timing corresponding to the flight pattern.

Thus far, the embodiment of the present invention has been described. As described above, in accordance with the fuel divider 66 of the present embodiment, the dividing ratio between the amount of the fuel supplied to the pilot fuel passage 64 and the amount of the fuel supplied to the main fuel passage 65 is adjusted automatically according to the fuel pressure (engine load). In addition, the valve opening or valve opening timing of the pilot port 76 and the valve opening or valve opening timing of the main port 77 can be adjusted easily according to the flight pattern (engine operating pattern) of the aircraft. Therefore, diffusion combustion and pre-mixed air-fuel mixture combustion can be carried out appropriately inside of the combustor 1.

It is not necessary to provide flow control valves in the pilot fuel passage 64 and in the main fuel passage 65, respectively. Therefore, a structure is simplified, and a complicated control circuit become unnecessary, which results in manufacturing cost saving. In addition, according to the fuel pressure, the pilot port 76 and the main port 77 gradually shift to a valve open state or a valve closed state. This makes it possible to smoothly adjust the amount of the fuel supplied to the pilot fuel passage 64 and the amount of the fuel supplied to the main fuel passage 65, corresponding to each fuel pressure. Further, since the main port 77 is closed by actuating the main port needle valve element 92, it has a high seal performance.

The switch timing has been described above on the basis of the fuel pressure difference (pressure difference between the pressure at the fuel entrance 75 of the fuel divider 66 and the pressure in the interior of the combustion chamber 12) which is the horizontal axis of each of the graphs of FIGS. 7 and 8. Instead of the fuel pressure difference, the switch timing can be described in the same manner on the basis of the fuel pressure at the fuel entrance 75 of the fuel divider 66. That is, when the fuel pressure at the fuel entrance 75 is lower than a pressure (hereinafter this pressure is referred to as "first pressure") corresponding to the above stated first switch pressure P1, only the pilot port 76 is opened, while when the fuel pressure at the fuel entrance 75 is higher than the first pressure, both of the pilot port 76 and the main port 77 are opened. When the fuel pressure at the fuel entrance 75 is higher than the first pressure and lower than a pressure (hereinafter this pressure is referred to as "second pressure") corresponding to the above stated second switch pressure P2, the opening degree of the pilot port 76 is gradually decreased and the opening degree of the main port 77 is gradually increased, with an increase in the fuel pressure at the fuel entrance 75. When the fuel pressure at the fuel entrance 75 is higher than the second pressure, the opening degree of the pilot port 76 and the opening degree of the main port 77 are maintained at constant values, regardless of an increase in the fuel pressure at the fuel entrance 75.

As should be appreciated from the above, the above stated "first pressure" is a fuel pressure at the fuel entrance 75 when the state in which only the pilot port 76 is opened switches to a state in which both of the pilot port 76 and the main port 77 are opened. The above stated "second pressure" is a fuel pressure at the fuel entrance 75 when the state in which the opening degree of the pilot port 76 and the opening degree of the main port 77 change according to a change in the fuel pressure at the fuel entrance 75 switches to the state in which the opening degree of the pilot port 76 and the opening degree of the main port 77 are unchanged irrespective of a change in the fuel pressure at the fuel entrance 75. The value of the "first pressure" and the value of the "second pressure" can be adjusted by the adjusting means 100.

Embodiment 2

Figure 9:
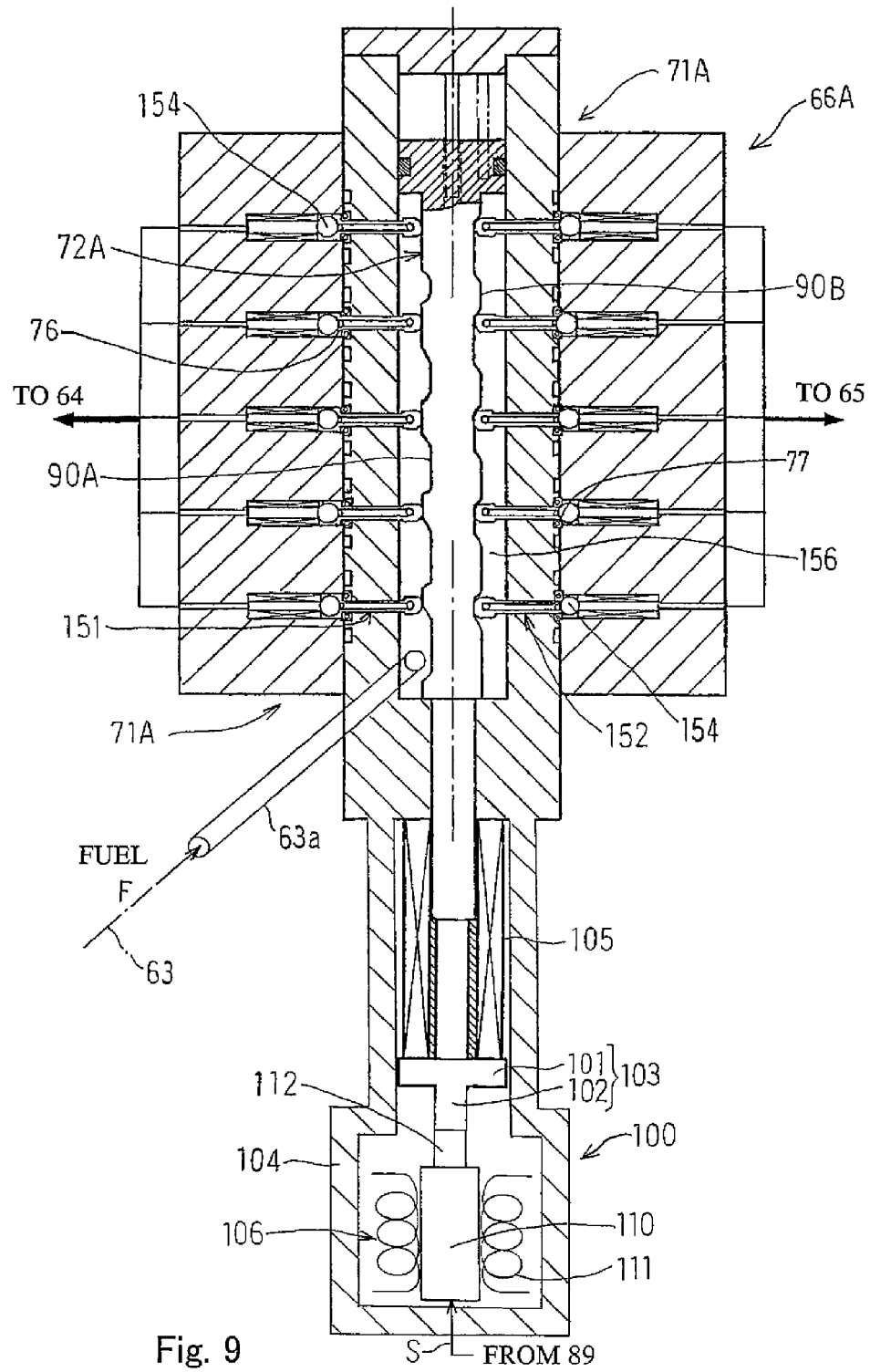
FIG. 9 is a longitudinal sectional view showing a fuel divider according to Embodiment 2 of the present invention.

Next, Embodiment 2 of the present invention will be described. A fuel supply device of Embodiment 2 is basically the same as the fuel supply device of Embodiment 1 except for the configuration of the fuel divider. Hereinafter, a fuel divider 66A of the present embodiment will be described in a larger part. FIG. 9 shows the fuel divider 66A of the present embodiment. As shown in FIG. 9, the fuel divider 66A is a multi-port type fuel divider including a plurality of pilot ports 76 and a plurality of main ports 77. The fuel divider 66A includes an elongated rod-like movable member 72A housed in a housing unit 71A. The movable member 72A is provided with a pilot port cam surface 90A having a plurality of cam channels on one (left side surface) of side surfaces and a main port cam surface 90B having a plurality of cam channels on the other side surface (right side surface). Press-up pins 151 are pressed against the cam surface 90A, while press-up pins 152 are pressed against the cam surface 90B.

When the fuel F flows from the collecting fuel passage 63 into an operating chamber 156 inside of the housing unit 71A, the movable member 72A moves axially according to the fuel pressure. When the movable member 72A moves axially, the press-up pins 151 and the press-up pins 152 advance or recede along the pilot port cam surface 90A and the main port cam surface 90B, respectively. Thereby, a plurality of valve elements 154 which are balls, respectively, move, thereby opening or closing the corresponding pilot ports 76 and the corresponding main ports 77. By suitably designing the shape of the pilot port cam surface 90A and the shape of the main port cam surface 90B, the fuel flow rate patterns shown in FIG. 8 are obtained. Furthermore, the fuel divider 66A of the present embodiment includes a spring adjusting unit (adjusting means) 100 similar to that of Embodiment 1. The spring adjusting unit 100 can adjust the spring force (counter force) applied by the adjustment spring element 105 to the movable member 72A, thereby changing the first switch pressure P1.

Embodiment 3

Figure 10:
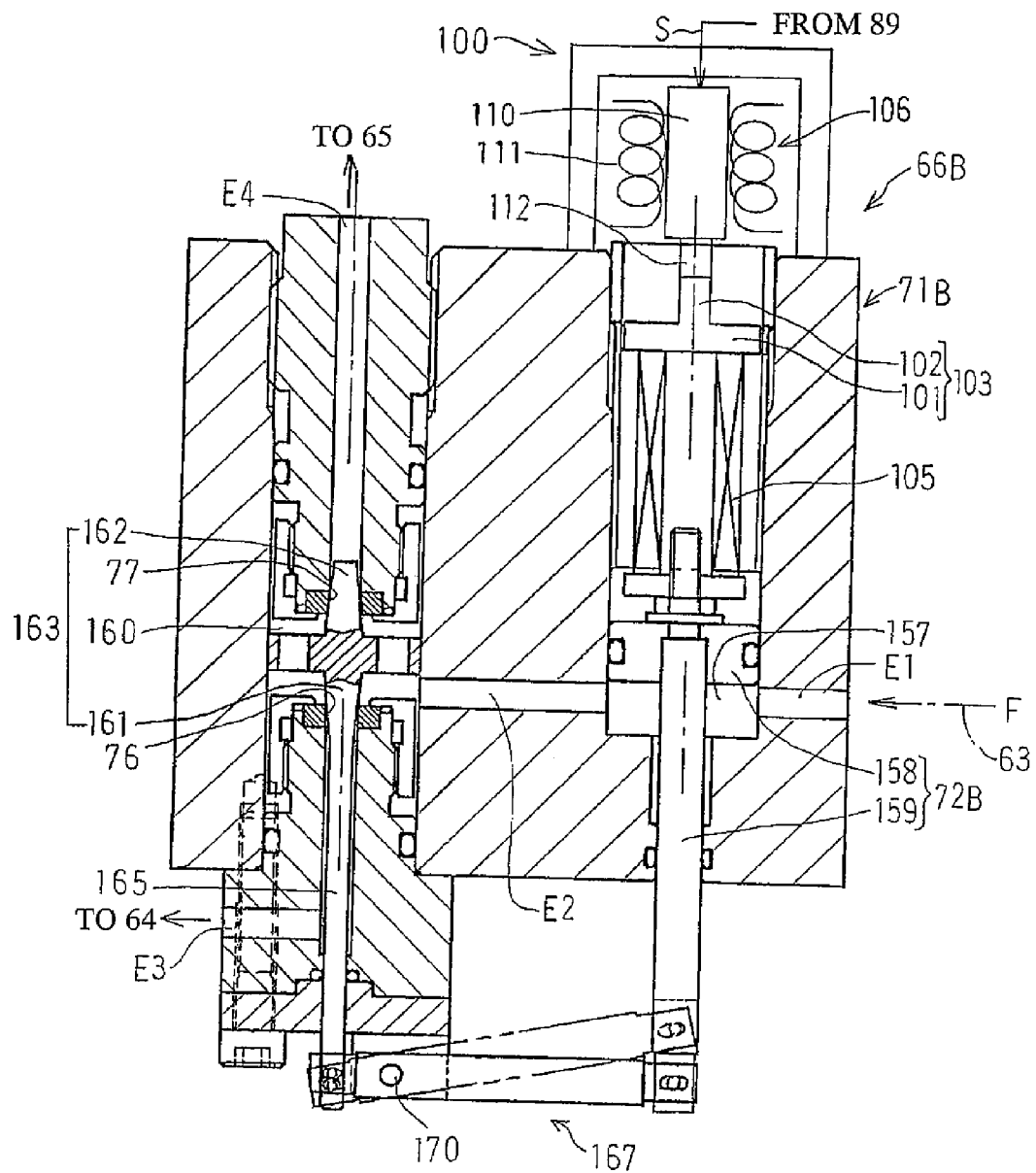
FIG. 10 is a longitudinal sectional view showing a fuel divider according to Embodiment 3 of the present invention.

Next, Embodiment 3 of the present invention will be described. A fuel supply device of Embodiment 3 is basically the same as the fuel supply device of Embodiment 1 except for the configuration of the fuel divider. Hereinafter, a fuel divider 66B of the present embodiment will be described in a larger part. FIG. 10 shows the fuel divider 66B of a needle type of the present embodiment. As shown in FIG. 10, the fuel divider 66B includes a movable member 72B. The movable member 72B includes a connecting rod 159, and a piston 158 housed in a drive chamber 157 inside of a housing unit 71B. A valve chamber 160 is formed inside of the housing unit 71B. A dual needle valve 163 is housed in the valve chamber 160. The dual needle valve 163 includes a pilot port needle valve element 161 for opening or closing the pilot port 76 and a main port needle valve element 162 for opening or closing the main port 77. The dual needle valve 163 is provided integrally with a valve actuating rod 165. The valve actuating rod 165 is coupled to the connecting rod 159 by means of a coupling mechanism 167.

When the fuel F flows from the collecting fuel passage 63 into the drive chamber 157 including the piston 158 housed therein, through a fuel entrance E1, the movable member 72B moves axially according to the fuel pressure of the fuel F1. When the movable member 72B moves axially, the dual needle valve 163 is moved axially via the coupling mechanism 167. Depending on the position of the dual needle valve 163, the state in which only the pilot port 76 is opened (low fuel pressure zone Z1) or the state in which both of the pilot port 76 and the main port 77 are opened (medium fuel pressure zone Z2, high fuel pressure zone Z3) is decided. The fuel F is introduced from the drive chamber 157 into the valve chamber 160 through a communicating passage E2. The fuel F supplied to the pilot fuel passage 64 flows through the pilot port 76 and flows out from a pilot exit E3. The fuel F supplied to the main fuel passage 65 flows through the main port 77 and flows out from a main exit E4. By suitably setting an arm length of the coupling mechanism 167 having a pivot 170, a stroke amount of the dual needle valve 163 can be adjusted. Furthermore, the fuel divider 66B of the present embodiment includes a spring adjusting unit (adjusting means) 100 similar to that of Embodiment 1. The spring adjusting unit 100 adjusts the spring force (counter force) applied by the adjustment spring element 105 to the movable member 72B, thereby enabling the first switch pressure P1 to be changed.

Embodiment 4

Figure 11:
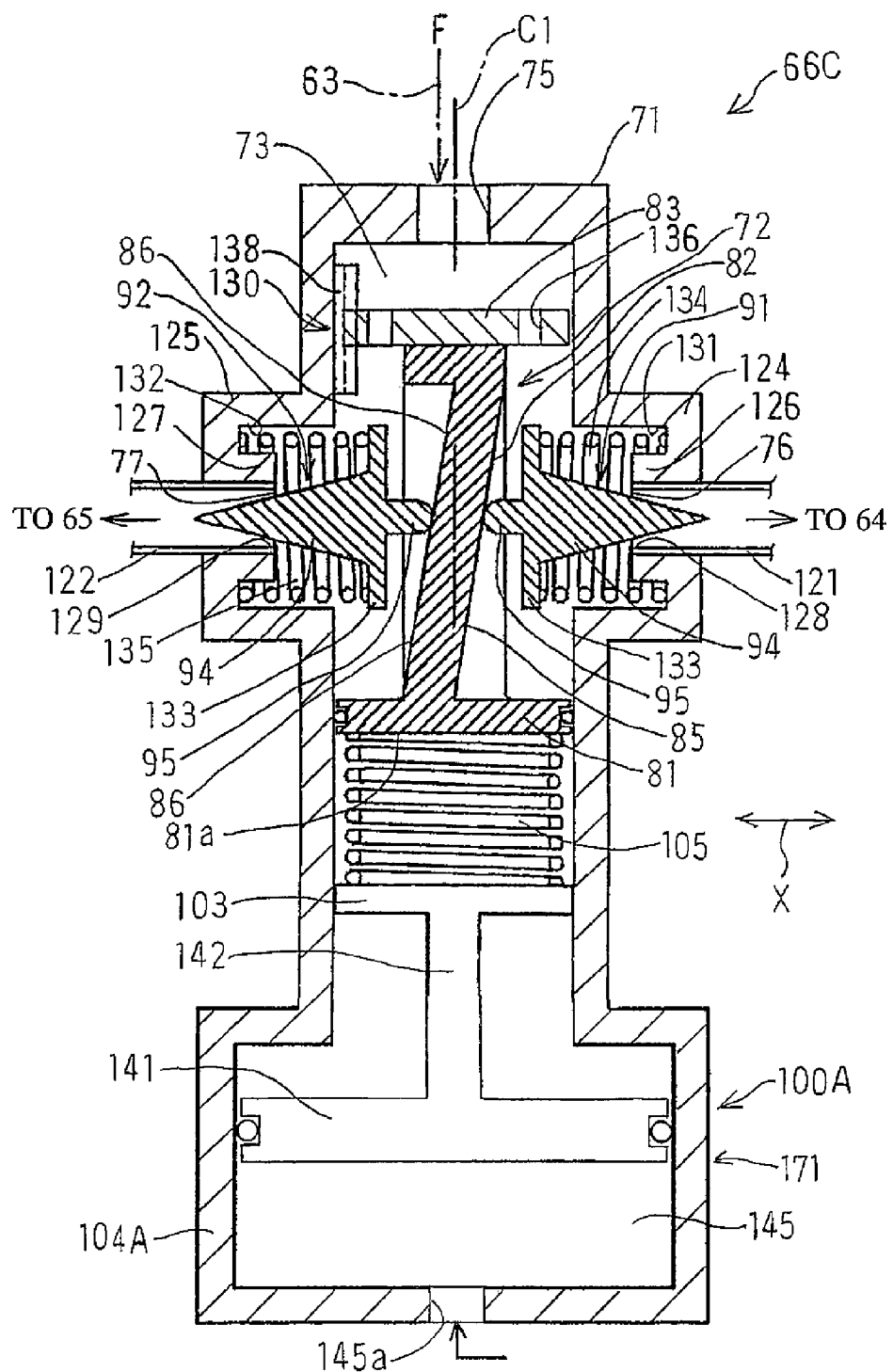
FIG. 11 is a longitudinal sectional view showing a fuel divider according to Embodiment 4 of the present invention.

Next, Embodiment 4 of the present invention will be described. A fuel supply device of Embodiment 4 is basically the same as the fuel supply device of Embodiment 1 except for the configuration of the fuel divider. Hereinafter, a fuel divider 66C of the present embodiment will be described in a larger part. FIG. 11 is a longitudinal sectional view showing the fuel divider 66C according to the present embodiment. The coil-shaped compressive adjustment spring element 105 is disposed between the bottom surface 81a of the pressure receiving bottom plate 81 and the spring receiver element 103, and applies an upward force to the movable member 72. The fuel divider 66C includes an adjusting means (spring adjusting unit) 100A. The adjusting means 100A is provided at the lower portion of the housing unit 71, and is configured to adjust a spring force applied by the adjustment spring element 105. That is, by adjusting the spring force (counter force) applied by the adjustment spring element 105 to the movable member 72, the first switch pressure P1 can be changed.

In a drive case 104A provided at the lower portion of the housing unit 71, a disc-shaped pressure receiver element 141 which is like a piston or a diaphragm is housed. The pressure receiver element 141 is coupled to the spring receiver member 103 located thereabove by means of a cylindrical coupling member 142. A drive chamber 145 is formed in the drive case 104A in a portion under the spring receiver element 141. The drive chamber 145 communicates with the combustor 1 via a pressure introduction opening 145a and the pressure take-out port 53 (see FIG. 2). In other words, the pressure in the drive chamber 145 is set equal to the entrance pressure in the combustor 1. The pressure receiver element 141 and the drive chamber 145 having the pressure introduction opening 145a constitute a drive member 171.

The entrance pressure in the combustor 1 changes according to an operating state (engine operating state) on a flight envelop. When a power output (fuel pressure) is increased during low-altitude and low-velocity flight, the entrance pressure in the combustor 1 becomes high because of a high air density in the low-altitude, and hence the pressure in the drive chamber 145 becomes high, which pushes up the adjustment spring element 105 to a greater degree. On the other hand, since a ram pressure is low because of the low velocity, and hence an entrance temperature of the combustor 1 is low, the fuel is combusted less easily in the interior of the combustion chamber 12 during a low load state. Therefore, at this time, combustion by using the pilot burners 3 with high combustion stability is desirably performed. This state is shown in FIG. 8C, in which combustion only using the pilot burners 3 is carried out in a range up to the first switch pressure P1 which is relatively high.

In contrast, when the power output (fuel pressure) is increased during high-altitude and high-velocity flight, the entrance pressure in the combustor becomes low because of a low air density in the high-altitude, and hence the pressure in the drive chamber 145 becomes low, which pushes up the adjustment spring element 105 to a smaller degree. On the other hand, since the ram pressure is high because of the high velocity, and hence an entrance temperature of the combustor 1 is high, the fuel is combusted more easily. This state is shown in FIG. 8A, in which the main port 77 is opened at the first switch pressure P1 which is relatively low. Thus, in accordance with the present embodiment, the fuel dividing pattern is adjusted automatically according to the flight pattern. In addition, in the present embodiment, since the drive device 106 of the adjusting means 100 of Embodiment 1 to Embodiment 3 is not provided, the structure is simplified. In addition to the pressure control based on the difference in the entrance pressure of the combustor between the low altitude and the high altitude, the entrance temperature of the combustor may be detected, and temperature control based on the difference in the entrance temperature may be performed.

Embodiment 5

Figure 12:
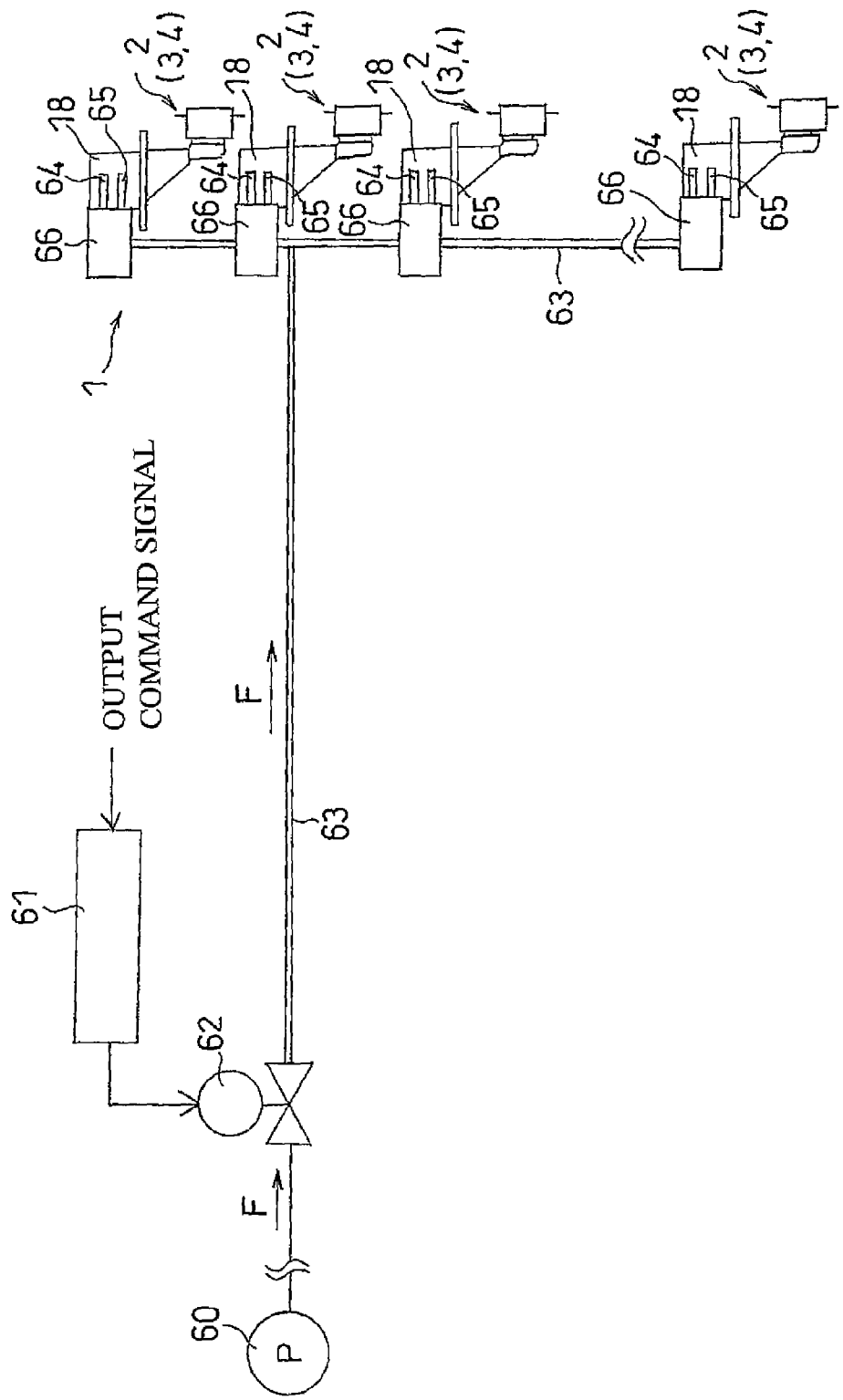
FIG. 12 is a view showing a fuel control system according to Embodiment 5 of the present invention.
Figure 13:
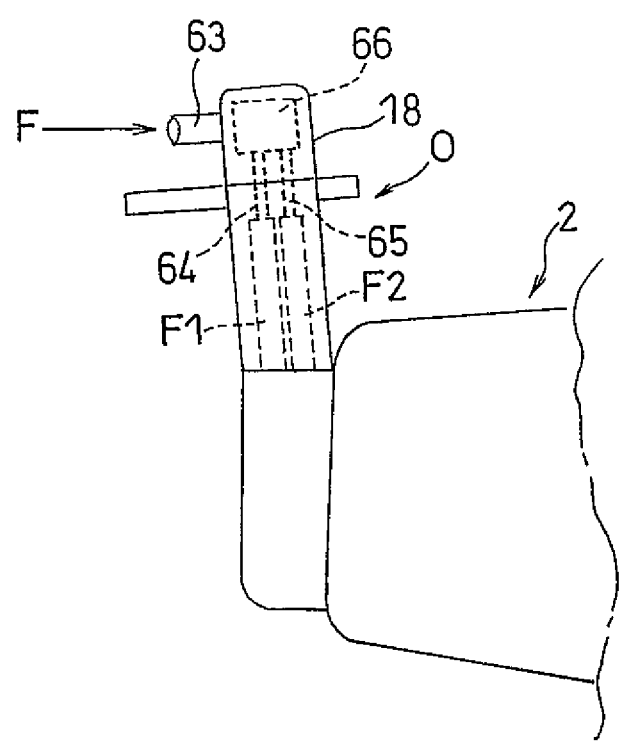
FIG. 13 is a side view showing in an enlarged manner major components in a fuel injection unit of FIG. 9.

Next, Embodiment 5 of the present invention will be described. A fuel supply device of Embodiment 5 is basically the same as the fuel supply device of Embodiment 1 except for the position and number of fuel dividers. FIG. 12 is a view showing a fuel control system of the present embodiment. In the present embodiment, the collecting fuel passage 63 is extended up to the fuel injection units 2, and the fuel divider 66 is provided for each of the fuel injection units 2 in a one-to-one correspondence. This follows that the pilot fuel passage 64 and the main fuel passage 65 are provided independently for each of the fuel injection units 2. As shown in FIG. 13, for example, each fuel divider 66 is built into, for example, the fuel pipe unit 18 of the corresponding fuel injection unit 2. In this configuration, the single collecting fuel passage 63 with a great cross-section is sufficient to reach each of the fuel injection units 2. This makes it easier to perform a piping work for laying out the fuel passage to the fuel injection units 2 as compared to the configuration in which two fuel passages, i.e., the pilot fuel passage 64 and the main fuel passage 65 are used, like Embodiment 1.

Although in the above embodiments, the fuel spraying method of the pilot burner is an air blast method, the present invention is not limited to this, but the fuel spraying method may be, for example, a pressure spraying method. Although the pre-mixed combustion method is used as a combustion method of the main burner, for example, a diffusion combustion method may be used.

REFERENCE SIGNS LISTS 1 combustor
2 fuel injection unit
3 pilot burner
4 main burner
12 combustion chamber
62 total flow rate control valve
63 collecting fuel passage
64 pilot fuel passage
65 main fuel passage
66 fuel divider
67 cut-off valve
71 housing unit (cylinder)
72 movable member (piston)
75 fuel entrance
76 pilot port
77 main port
100 adjusting means (spring adjusting unit)
105 adjustment spring element
106 drive device
F fuel
P1 first switch pressure
P2 second switch pressure
Z1 low load zone
Z2 medium load zone
Z3 high load zone

The invention claimed is:

1. A fuel supply device of a gas turbine engine, which supplies a fuel to a combustor including a pilot burner and a main burner; the fuel supply device comprising:

a pilot fuel passage through which the fuel is supplied to the pilot burner;
a main fuel passage through which the fuel is supplied to the main burner;
a collecting fuel passage through which the fuel is supplied to the pilot fuel passage and to the main fuel passage; and
a fuel divider which divides the fuel supplied from the collecting fuel passage to feed the fuel to the pilot fuel passage and to the main fuel passage;
wherein the fuel divider includes:
a fuel entrance into which the fuel supplied from the collecting fuel passage is introduced;
a pilot port connected to the pilot fuel passage;
a main port connected to the main fuel passage;
a movable member which is movable according to a fuel pressure at the fuel entrance, the movable member being configured to open only the pilot port when the fuel pressure at the fuel entrance is lower than a first pressure, and to open both of the pilot port and the main port when the fuel pressure at the fuel entrance is higher than the first pressure; and
an adjusting means for adjusting a value of the first pressure in such a manner that the adjusting means applies to the movable member a counter force in a direction opposite to a direction in which the movable member moves according to the fuel pressure at the fuel entrance, and adjusts the counter force,
wherein the fuel divider further includes a pilot port needle valve element, and a main port needle valve element;
wherein the movable member closes the main port via the main port needle valve element when the fuel pressure at the fuel entrance is lower than the first pressure;
wherein the movable member gradually decreases an opening degree of the pilot port via the pilot port needle valve element, and gradually increases an opening degree of the main port via the main port needle valve element, with an increase in the fuel pressure at the fuel entrance, when the fuel pressure at the fuel entrance is higher than the first pressure and lower than a second pressure; and
wherein the movable member maintains the opening degree of the pilot port at a constant value via the pilot port needle valve element, and maintains the opening degree of the main port at a constant value via the main port needle valve element, irrespective of an increase in the fuel pressure at the fuel entrance, when the fuel pressure at the fuel entrance is higher than the second pressure.

2. The fuel supply device of the gas turbine engine according to claim 1,
wherein the adjusting means is actuated based on an entrance temperature of the combustor.

3. The fuel supply device of the gas turbine engine according to claim 2,
wherein the adjusting means includes a spring element for applying the counter force to the movable member.

4. The fuel supply device of the gas turbine engine according to claim 3,
wherein the adjusting means includes a drive device constituted by a hydraulic cylinder, a stepping motor, or a servo motor; and
wherein the drive device is configured to change a length of the spring element to adjust the counter force.

5. The fuel supply device of the gas turbine engine according to claim 1, wherein the adjusting means is actuated based on an entrance pressure of the combustor.

6. The fuel supply device of the gas turbine engine according to claim 5,
wherein the adjusting means includes:
a spring element for applying the counter force to the movable member; and
a drive member which is displaceable according to the entrance pressure of the combustor applied to the drive member and coupled to the spring element; and
the driver member is displaced and a length of the spring element changes to adjust the counter force.

7. A fuel supply device of a gas turbine engine, which supplies a fuel to a combustor including a pilot burner and a main burner; the fuel supply device comprising:
a pilot fuel passage through which the fuel is supplied to the pilot burner;
a main fuel passage through which the fuel is supplied to the main burner;
a collecting fuel passage through which the fuel is supplied to the pilot fuel passage and to the main fuel passage; and
a fuel divider which divides the fuel supplied from the collecting fuel passage to feed the fuel to the pilot fuel passage and to the main fuel passage;
wherein the fuel divider includes:
a fuel entrance into which the fuel supplied from the collecting fuel passage is introduced;
a pilot port connected to the pilot fuel passage;
a main port connected to the main fuel passage;
a movable member which is movable according to a fuel pressure at the fuel entrance, the movable member being configured to open only the pilot port when the fuel pressure at the fuel entrance is lower than a first pressure, and to open both of the pilot port and the main port when the fuel pressure at the fuel entrance is higher than the first pressure; and
a movable support member that adjusts a value of the first pressure in such a manner that the movable support member applies to the movable member a counter force in a direction opposite to a direction in which the movable member moves according to the fuel pressure at the fuel entrance, and adjusts the counter force,
wherein the fuel divider further includes a pilot port needle valve element, and a main port needle valve element;
wherein the movable member closes the main port via the main port needle valve element when the fuel pressure at the fuel entrance is lower than the first pressure;

wherein the movable member gradually decreases an opening degree of the pilot port via the pilot port needle valve element, and gradually increases an opening degree of the main port via the main port needle valve element, with an increase in the fuel pressure at the fuel entrance, when the fuel pressure at the fuel entrance is higher than the first pressure and lower than a second pressure; and
wherein the movable member maintains the opening degree of the pilot port at a constant value via the pilot port needle valve element, and maintains the opening degree of the main port at a constant value via the main port needle valve element, irrespective of an increase in the fuel pressure at the fuel entrance, when the fuel pressure at the fuel entrance is higher than the second pressure.

8. The fuel supply device of the gas turbine engine according to claim 7,
wherein the movable support member is actuated based on an entrance temperature of the combustor.

9. The fuel supply device of the gas turbine engine according to claim 8,
wherein the movable support member includes a spring element for applying the counter force to the movable member.

10. The fuel supply device of the gas turbine engine according to claim 9,
wherein the movable support member includes a drive device constituted by a hydraulic cylinder, a stepping motor, or a servo motor; and
wherein the drive device is configured to change a length of the spring element to adjust the counter force.

11. The fuel supply device of the gas turbine engine according to claim 7,
wherein the movable support member is actuated based on an entrance pressure of the combustor.

12. The fuel supply device of the gas turbine engine according to claim 11,
wherein the movable support member includes:
a spring element for applying the counter force to the movable member; and
a drive member which is displaceable according to the entrance pressure of the combustor applied to the drive member and coupled to the spring element; and
the driver member is displaced and a length of the spring element changes to adjust the counter force.

* * * * *